(12) United States Patent
Rhodes et al.

(10) Patent No.: US 6,224,339 B1
(45) Date of Patent: May 1, 2001

(54) HIGH TEMPERATURE AIRFOIL

(75) Inventors: Jeffrey F. Rhodes, Zionsville; Jon D. Harvey, Pendleton, both of IN (US)

(73) Assignee: Allison Advanced Development Company, Indianapolis, IN (US)

( * ) Notice: Subject to any disclaimer, the term of this patent is extended or adjusted under 35 U.S.C. 154(b) by 0 days.

(21) Appl. No.: 09/111,651

(22) Filed: Jul. 8, 1998

(51) Int. Cl.[7] ................................................ F01D 5/18
(52) U.S. Cl. .................. 416/224; 416/229 A; 416/96 R; 416/96 A; 416/97 R; 29/428; 29/889.71; 244/132; 403/353; 403/381
(58) Field of Search ............................... 416/224, 229 R, 416/229 A, 230, 241 R, 241 B, 95, 96 R, 96 A, 97 R, 131, 132 R, 140; 415/115, 191, 200; 244/132, 123; 403/381, 353; 29/889.71, 890.01, 428

(56) References Cited

U.S. PATENT DOCUMENTS

| | | | |
|---|---|---|---|
| 3,071,400 | * | 1/1963 | Bellock ................................ 403/353 |
| 3,430,898 | | 3/1969 | Parechanian et al. . |
| 3,689,178 | | 9/1972 | Faber et al. . |
| 4,270,256 | | 6/1981 | Ewing . |
| 4,311,433 | * | 1/1982 | Bratton et al. .................... 416/241 R |
| 4,528,048 | * | 7/1985 | Gell et al. ......................... 416/241 R |
| 4,553,484 | * | 11/1985 | Cox ....................................... 403/353 |
| 4,728,262 | * | 3/1988 | Marshall ............................... 416/224 |
| 5,005,304 | * | 4/1991 | Briscoe et al. ........................ 403/381 |
| 5,030,060 | | 7/1991 | Liang . |
| 5,085,559 | | 2/1992 | Stoffer et al. . |
| 5,193,244 | * | 3/1993 | Meyers ................................. 403/381 |
| 5,236,151 | | 8/1993 | Hagle et al. . |
| 5,340,280 | | 8/1994 | Schilling . |
| 5,348,446 | * | 9/1994 | Lee et al. .......................... 416/241 R |
| 5,358,379 | | 10/1994 | Pepperman et al. . |
| 5,511,747 | | 4/1996 | Parrot et al. . |
| 5,542,820 | | 8/1996 | Eaton et al. . |
| 5,632,601 | | 5/1997 | Bodmer et al. . |
| 5,634,771 | | 6/1997 | Howard et al. . |
| 5,699,587 | * | 12/1997 | Thul ..................................... 403/353 |

FOREIGN PATENT DOCUMENTS

| | | | | |
|---|---|---|---|---|
| 3821005 | * | 12/1989 | (DE) | ..................................... 416/224 |
| 2061398 | * | 5/1981 | (GB) | ................................. 416/241 R |
| 54-10806 | * | 1/1979 | (JP) | ................................... 416/241 R |
| 55-60604 | * | 5/1980 | (JP) | .................................... 416/97 R |
| 59-502 | * | 1/1984 | (JP) | ..................................... 416/224 |

* cited by examiner

*Primary Examiner*—Christopher Verdier
(74) *Attorney, Agent, or Firm*—Woodard, Emhardt, Naughton, Moriarty & McNett

(57) ABSTRACT

A high temperature repairable airfoil having a plurality of flow path cover tiles coupled to a single crystal spar member. In one embodiment, the plurality of flow path cover tiles include an attachment portion that is received within a groove formed in the outer surface of the spar. The attachment portion slides into a retaining feature within the groove so as to limit movement of the plurality of flow path cover tiles. Upon rotation of the airfoil, the plurality of flow path cover tiles become centrifugally loaded with a portion of the spar member. In one embodiment, the plurality of flow path cover tiles are formed of a material selected from the group consisting of ceramics, intermetallic, and thermal barrier coated single crystal alloy material.

48 Claims, 17 Drawing Sheets

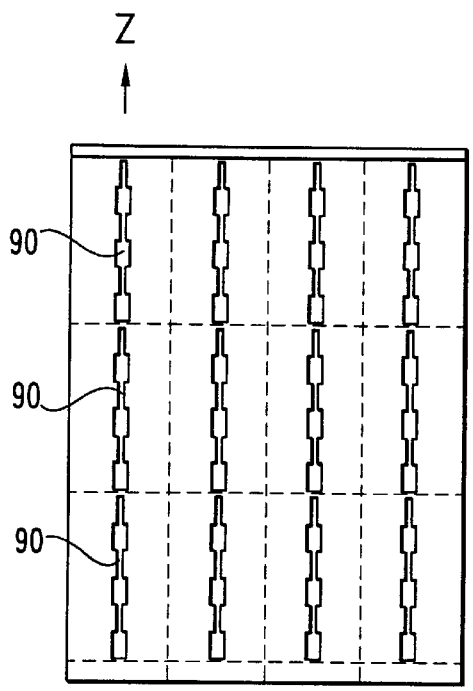
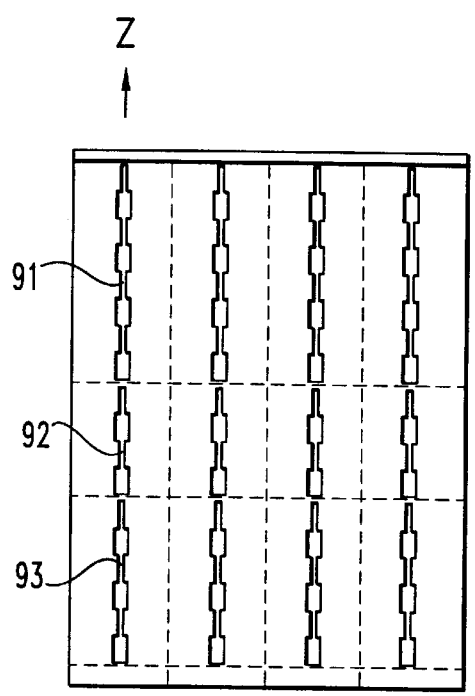
Fig. 8     Fig. 9
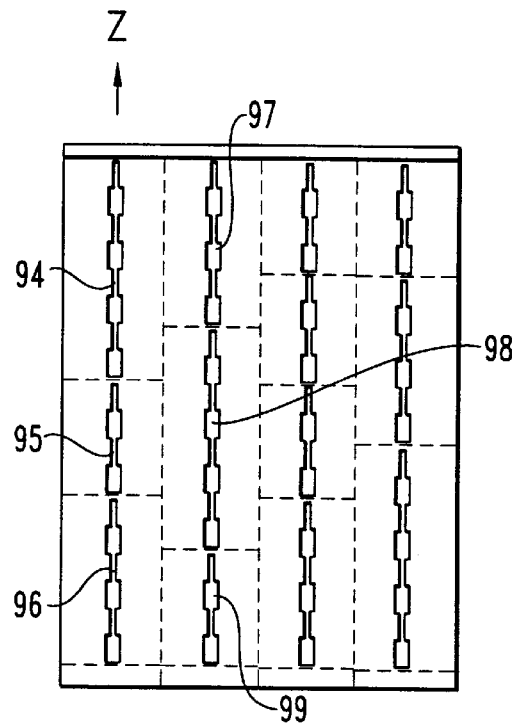
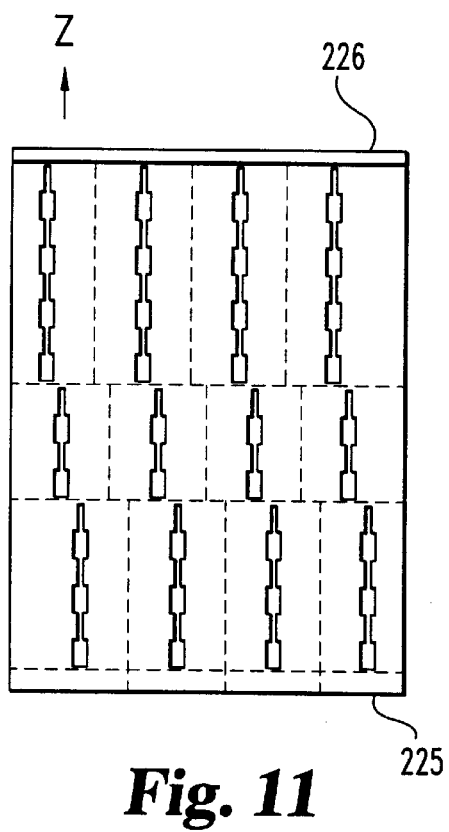
Fig. 10     Fig. 11

HIGH TEMPERATURE AIRFOIL

BACKGROUND OF THE INVENTION

The present invention relates generally to the field of gas turbine engine airfoils. More particularly, one embodiment of the present invention defines a high temperature airfoil including a metallic spar with a plurality of replaceable tiles coupled thereto. Although the present invention was developed for use in a gas turbine engine, certain applications may be outside this field.

A gas turbine engine is typical of turbo machinery in which the concept described herein may be advantageously employed. It is well known that a gas turbine engine conventionally comprises a compressor for compressing the inlet air to an increased pressure for combustion in a combustor chamber. A mixture of fuel and the increased pressure air is burned in the combustor chamber to generate a high temperature gaseous flow stream for causing rotation of the turbine blades within the turbine. The turbine blades convert the energy from the high temperature gaseous flow stream into kinetic energy, which is utilized to turn a propeller, fan or other device. Further, the high temperature gaseous flow stream may be used directly as a thrust for providing motive power, such as in a turbine jet engine.

A long recognized need by many gas turbine engine designers is to attain higher operating temperatures in order to achieve both a greater thermodynamic efficiency and increased power output per unit of engine weight. Theoretically, a gas turbine engine would operate at stoichiometric combustion in order to extract the greatest possible energy value from the fuel consumed. However, temperatures at stoichiometric and even near stoichiometric combustion are generally beyond the endurance capabilities of traditional metallic gas turbine engine components. Consequently, significant efforts have focused on developing enhanced cooling techniques and temperature and oxidation resistant metals for use in components of the engine, which are exposed to the highest temperatures. More specifically, cooling techniques and high temperature metals have been developed for many components such as combustion chambers, turbine nozzles, and turbine blades.

An alternate approach to the attainment of higher operating temperatures in a gas turbine engine involves the use of components formed from ceramic materials. Ceramic components are better able to withstand the high temperature oxidizing environment within the gas turbine engine. However, while many ceramic materials exhibit superior high temperature strength and oxidation resistance, they have historically been difficult to utilize in gas turbine engines because of a comparatively low tensile fracture strength.

Heretofore, there has been a need for light weight high temperature gas turbine engine components. The present invention satisfies this need in a novel and unobvious way.

SUMMARY OF THE INVENTION

One form of the present invention contemplates a combination, comprising: an airfoil shaped device having an outer surface; a structural member disposed within the device, the structural member has a groove formed therein or an attachment member extending therefrom; and a cover member defining at least a portion of the outer surface, the cover member has the other of the groove formed therein or the attachment member extending therefrom, the attachment member extends into the groove to couple the structural member and the cover member and allow relative sliding motion therebetween so as to bias a portion of the cover member against the structural member during rotation.

Another aspect of the present invention contemplates a method for coupling a flow path cover tile with a spar. The method comprising: providing a first member having a plurality of mechanical attachment members extending therefrom and a second member having a groove with a plurality of receiving portions and a plurality of restraining portions; positioning the plurality of mechanical attachment members within the plurality of receiving portions; moving the first member and second member relative to one another so that the plurality of mechanical attachment members are positioned within the plurality of restraining portions; and, supporting one of the first member and the second member in a first location during a static state.

Yet another aspect of the present invention contemplates a combination, comprising: an airfoil shaped device having an outer surface; a structural member disposed within the device; a cover member defining a portion of the outer surface, one of the cover member and the structural member has a mechanical attachment portion and the other of the cover member and the structural member has a receiving portion; the mechanical attachment portion has a plurality of spaced upstanding mechanical retainers extending therefrom; and, the receiving portion defines a groove with a first portion having a width at least as wide as the mechanical retainers and a second portion with a width less than the width of the mechanical retainers, wherein the plurality of spaced mechanical retainers are positionable within the second portion to couple the cover member to the structural member.

Another form of the present invention contemplates a combination, comprising: an airfoil shaped device having an outer surface; a structural member disposed within the device; a plurality of flow path cover tiles defining a portion of the outer surface; and plug and slide means for coupling each of the plurality of flow path cover tiles with the structural member.

One object of the present invention is to provide an improved high temperature airfoil.

Related objects and advantages of the present invention will be apparent from the following description.

BRIEF DESCRIPTION OF THE DRAWINGS

FIG. 6 is an illustrative sectional view taken along line 2—2 of FIG. 2a.

FIG. 7 is an illustrative sectional view of an alternate embodiment of the airfoil taken along a sectional plane corresponding to section 2—2 of FIG. 2a.

FIG. 8 is a schematic view of one embodiment of an airfoil with the plurality of flow path tiles removed.

FIG. 9 is a schematic view of another embodiment of an airfoil with the plurality of flow path tiles removed.

FIG. 10 is a schematic view of another embodiment of an airfoil with the plurality of flow path tiles removed.

FIG. 11 is a schematic view of another embodiment of an airfoil with the plurality of flow path tiles removed.

DESCRIPTION OF THE PREFERRED EMBODIMENT

Figure 1:
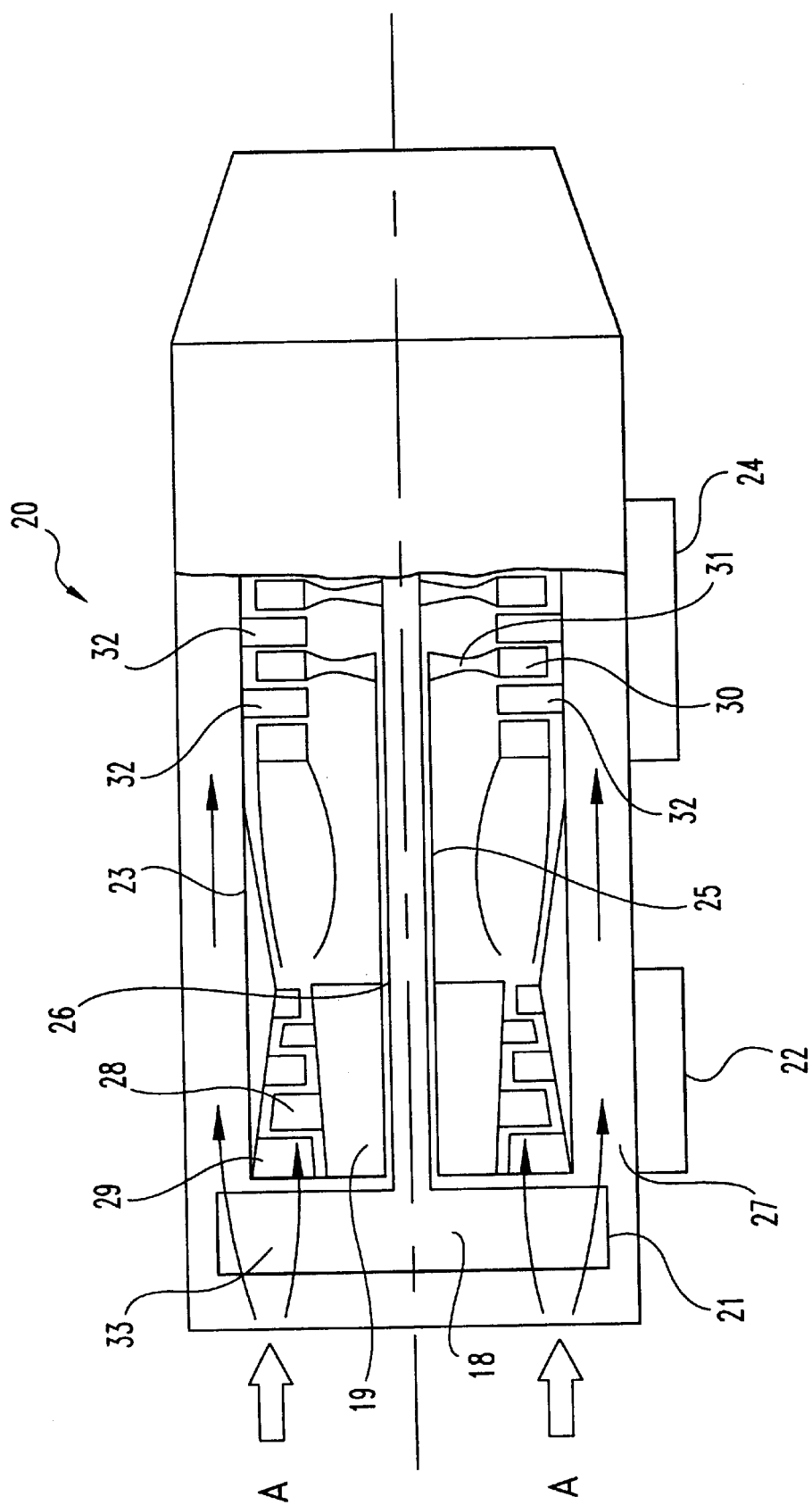
FIG. 1 is an illustrative view of a turbo-fan.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a gas turbine engine 20 which includes a fan section 21, a compressor section 22, a combustor section 23, and a turbine section 24 that are integrated together to produce an aircraft flight propulsion engine. This type of gas turbine engine is generally referred to as a turbo-fan. One alternate form of a gas turbine engine includes a compressor, a combustor, and a turbine that have been integrated together to produce an aircraft flight propulsion engine without the fan section. The term aircraft is generic and includes helicopters, airplanes, missiles, unmanned space devices and any other substantially similar devices. It is important to realize that there are a multitude of ways in which the gas turbine engine components can be linked together. Additional compressors and turbines could be added with intercoolers connecting between the compressors and reheat combustion chambers could be added between the turbines.

A gas turbine engine is equally suited to be used for an industrial application. Historically, there has been widespread application of industrial gas turbine engines, such as pumping sets for gas and oil transmission lines, electricity generation, and naval propulsion.

The compressor section 22 includes a rotor 19 having a plurality of compressor blades 28 coupled thereto. The rotor 19 is affixed to a shaft 25 that is rotatable within the gas turbine engine 20. A plurality of compressor vanes 29 are positioned within the compressor section 22 to direct the fluid flow relative to blades 28. Turbine section 24 includes a plurality of turbine blades 30 that are coupled to a rotor disk 31. The rotor disk 31 is affixed to the shaft 25, which is rotatable within the gas turbine engine 20. Energy extracted in the turbine section 24 from the hot gas exiting the combustor section 23 is transmitted through shaft 25 to drive the compressor section 22. Further, a plurality of turbine vanes 32 are positioned within the turbine section 24 to direct the hot gaseous flow stream exiting the combustor section 23.

The turbine section 24 provides power to a fan shaft 26, which drives the fan section 21. The fan section 21 includes a fan 18 having a plurality of fan blades 33. Air enters the gas turbine engine 20 in the direction of arrows A and passes through the fan section 21 into the compressor section 22 and a bypass duct 27. The term airfoil will be utilized herein to refer to fan blades, fan vanes, compressor blades, turbine blades, compressor vanes, and turbine vanes unless specifically stated otherwise in the text. Further details related to the principles and components of a conventional gas turbine engine will not be described herein as they are believed known to one of ordinary skill in the art.

Figure 2A:
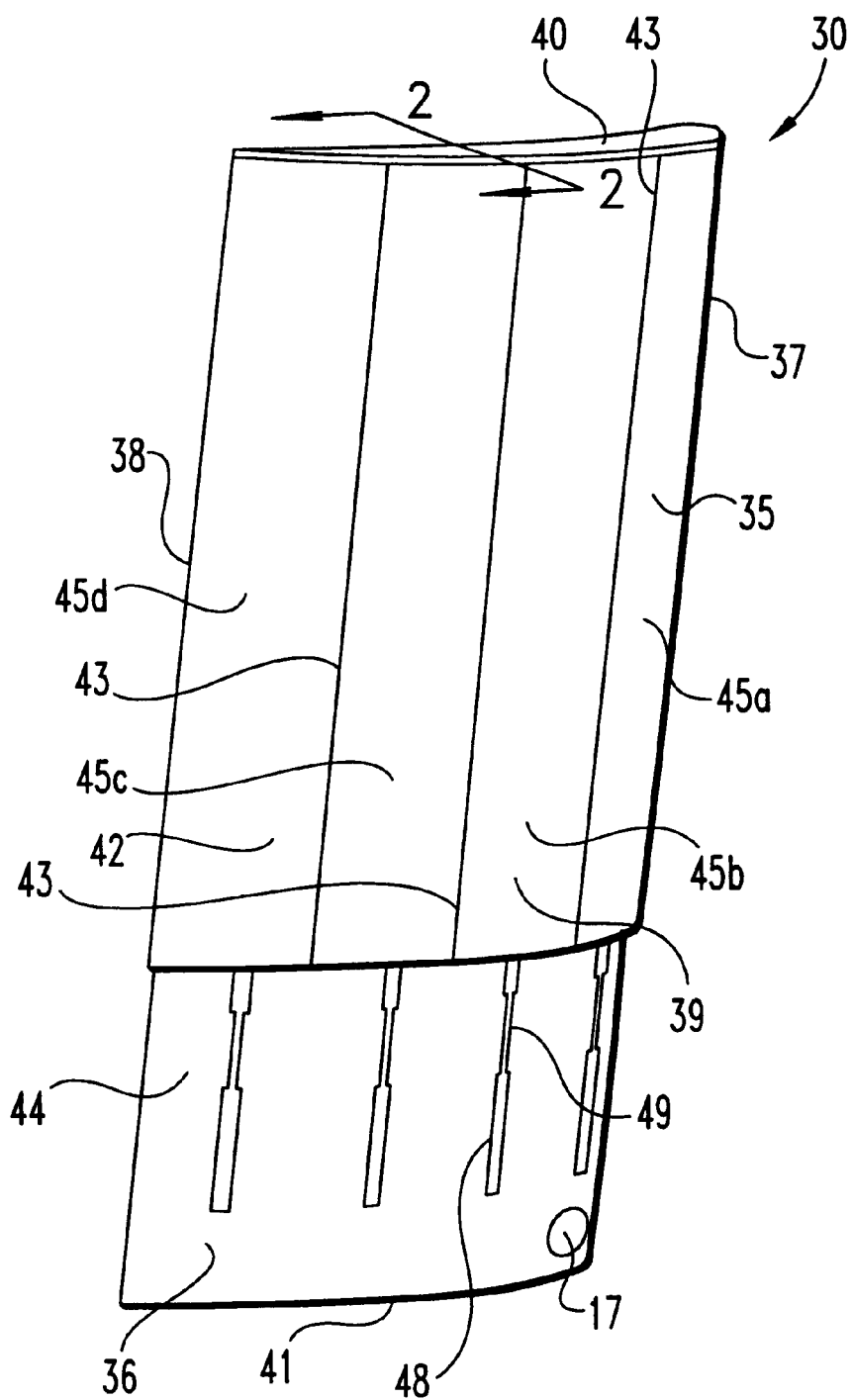
FIG. 2a is a perspective view of one embodiment of the present invention, which comprises an airfoil of the FIG. 1 turbo-fan engine.

With reference to FIG. 2a, there is illustrated a perspective view of the gas turbine engine airfoil 30. The gas turbine engine airfoil 30 has as its principle regions an airfoil portion 35 and a shank portion 36. Shank portion 36 is connected to disk 31 by a mechanical attachment such as a dovetail, firtree, root pinning, or by bonding. The shank portion has a central conduit formed therein, which is in fluid communication with a hollow cavity or passageway within the airfoil portion 35. The central conduit has an inlet 17 for receiving cooling media from the compressor 22 and passing the cooling media through the shank portion central conduit and into the airfoil portion 35. Preferably, the cooling media is a compressible fluid such as, but not limited to, air.

The airfoil portion 35 has a leading edge 37, a trailing edge 38, and an outer surface 39 extending therebetween. Hereinafter, the term spanwise will indicate an orientation between a tip 40 and an opposite other end 41, which is often referred to as the hub or root; and the term streamwise will indicate an orientation between the leading edge 37 and the trailing edge 38. The leading edge 37 faces in an upstream direction with respect to the approaching fluid flow and the trailing edge 38 faces in a downstream direction. The airfoil 30 includes a convex suction side 42 and an opposite concave pressure side (not illustrated). Arranged along the outer surface 39 of the airfoil 30 are a plurality of spanwise extending cooling media exit slots 43 that allow the discharge of cooling media across the outer surface so as to provide film cooling. The discharging cooling media exits through the cooling media exit slots 43 into the fluid flow path to cool the outer surface 39.

Gas turbine engine airfoil 30 has an outer surface 39 that is defined by a plurality of flow path cover tiles $45_{a-d}$ that are removably coupled to a structural member 44. The opposite concave pressure side (not illustrated) also forms a portion of the outer surface 39, and is likewise covered by a plurality of flow path cover tiles. Structural member 44 will be referred to hereinafter as a spar, and spar 44 is not limited to having an outer profile that corresponds to an airfoil shape of the outer surface 39. The plurality of flow path cover tiles $45_{a-d}$ are mechanically attached to the spar so as to be readily repairable/replaceable. The plurality of flow path tiles 45 can be of any quantity needed to meet specific design parameters. In the preferred embodiment, the plurality of flow path cover tiles 45 are formed of a material selected from the group consisting of ceramic, intermetallic or a thermal barrier coated alloy material. More specifically, the thermal barrier coated material would be a single crystal alloy material. The plurality of flow path cover tiles may be formed of the same material or may have a different material for each of the plurality of flow path tiles 45 across the outer surface 39. For example, flow path cover tile $45_a$ may be a thermal barrier coated single crystal alloy tile and the remaining flow path cover tiles $45_{b-d}$ may be ceramic. Further, each of the flow path cover tiles may have different material properties from those adjacent it.

Figure 2B:
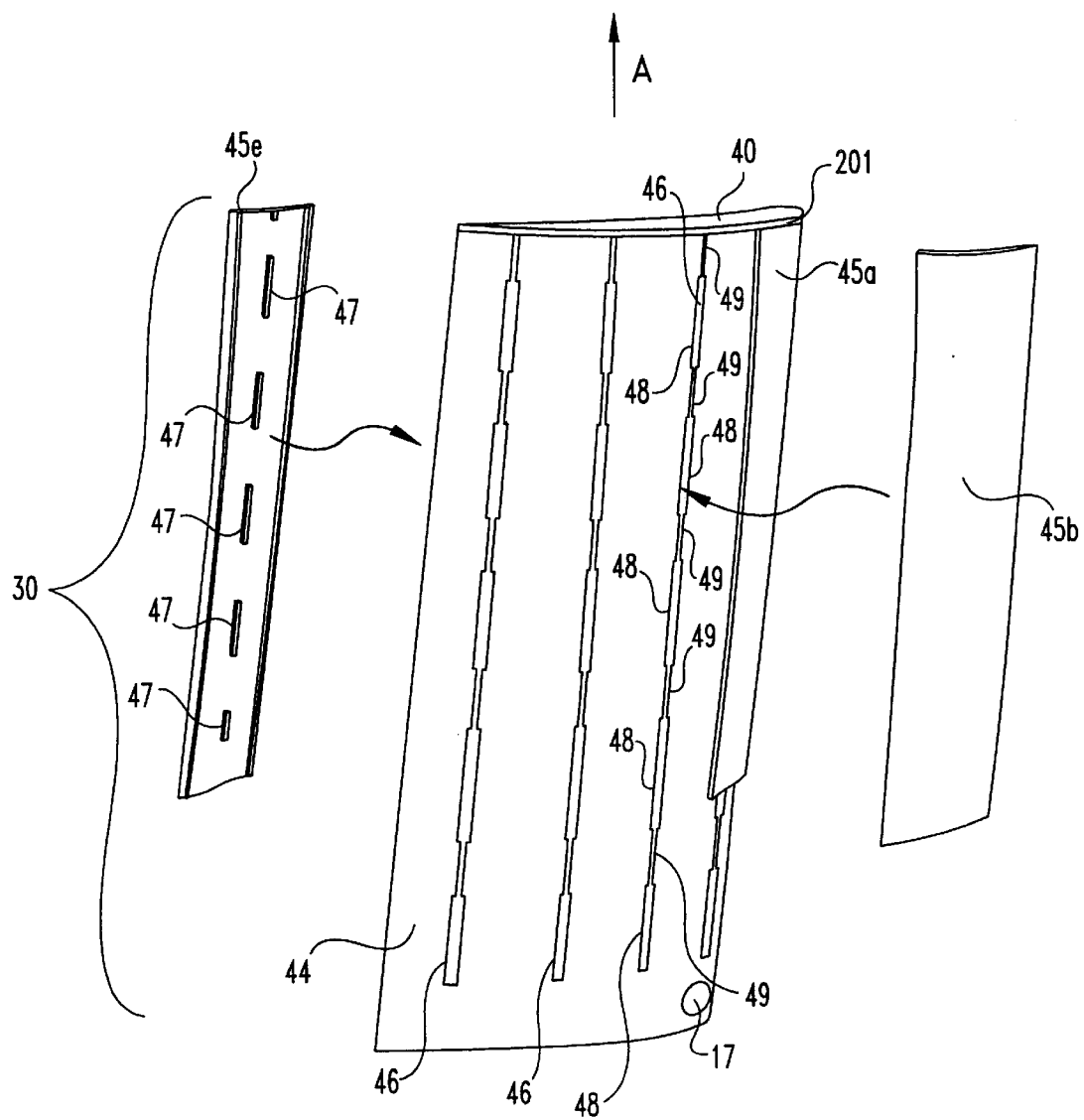
FIG. 2b is an illustrative partially exploded view of the FIG. 2a airfoil.

With reference to FIG. 2b, there is illustrated an exploded view of the airfoil 30. The plurality of flow path cover tiles 45 are removably coupled to the spar 44. For illustrative purposes only, flow path cover tiles $45_a$, $45_b$, and $45_e$ are shown being coupled to the spar 44. The spar 44 is preferably formed of a heat resistant superalloy composition. There are various types of superalloy compositions, such as but not limited to nickel based or cobalt based compositions and the manufacturers of such compositions are generally known to those skilled in the art. Most superalloy compositions of interest are complicated mixtures of nickel, chromium, aluminum and other select elements. The spar 44 is preferably a unitary cast configuration. However, alternative embodiments of spar 44 contemplate an assembly of cast components and/or an assembly of cast and wrought components. The spar 44 may be an equiax, directionally solidified, or a single crystal alloy structure. In the preferred embodiment, the spar 44 is a cast integral single crystal structure.

The spar 44 includes a plurality of grooves 46 for receiving a mechanical attachment portion 47 therein. Mechanical attachment portion 47 is formed on each of the plurality of flow path cover tiles 45. In the preferred embodiment the grooves 46 are formed on the spar 44 and the mechanical attachment portions 47 extend from the inner surface of the flow path cover tiles 45. The grooves 46 are preferably cast into the spar 44, however, in an alternative embodiment, the grooves 46 are machined into the spar 44. However, in an alternate embodiment the grooves are formed in the cover tiles and the mechanical attachment portion extends from the spar. The disclosure herein will describe the grooves 46 being formed in the spar 44 and the mechanical attachment portion 47 extending from the flow path cover tiles 45. It is understood that the grooves could be formed in either the spar or the flow path cover tiles, and the mating portion would therefore be formed in the other of the spar or flow path cover tiles.

Mechanical attachment portion 47 and the groove 46 defines a means for attaching each of the plurality of flow path cover tiles 45 to the spar 44. The means for attaching is preferably defined by a "plug and slide" technique. More specifically, each of the individual flow path cover tiles 45 has a mechanical attachment portion 47 which corresponds to a groove 46 formed in the spar 44. Each of the mechanical attachment portions 47 are aligned with the respective groove entry portion 48 of groove 46. Thereafter, the individual flow path cover tile 45 has its mechanical attachment portion 47 placed in the groove entry portion 48. The flow path cover tile 45 is moved within the groove 46 from the groove entry portion 48 to the groove restraining portion 49.

Figure 3:
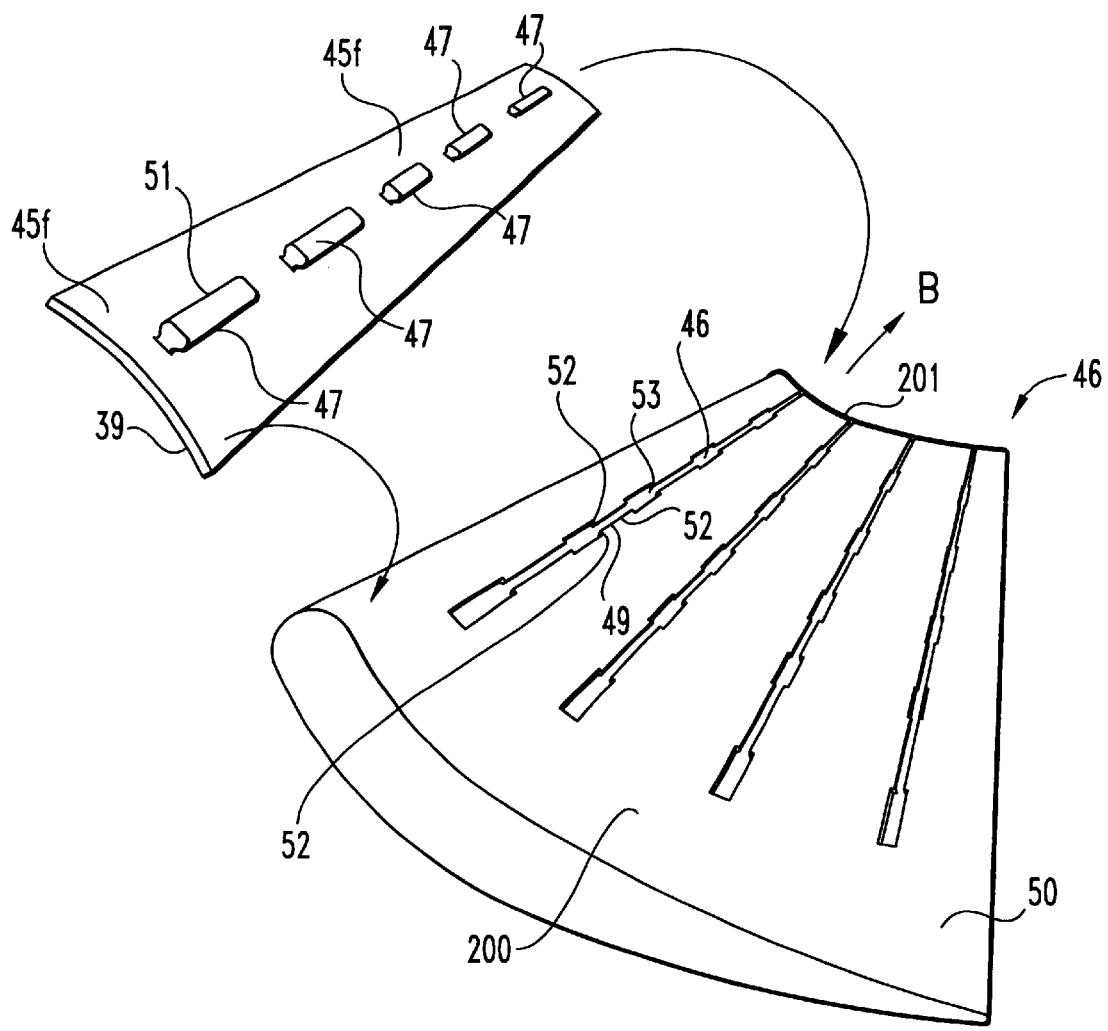
FIG. 3 is an enlarged illustrative view of the FIG. 2a airfoil.

With reference to FIG. 3, there is illustrated an assembly view of the airfoil 30. The concave pressure side 50 has been shown, however, the "plug and slide" mechanical attachment technique is applicable to affixing a flow path cover tile to any surface on the airfoil. One of the plurality of flow path cover tiles $45_f$ with mechanical attachment portion 47 is shown in an enlarged view. In assembly the cover tile $45_f$ is oriented such that the mechanical attachment portions 47 mate with groove 46 and outer surface 39 is positioned so as to be directed into the flow path. The mechanical attachment portion 47 includes a dovetail member 51. While a dovetail 51 is shown in the figure, it is understood that other mechanical retainers having different sizes and geometries are contemplated herein. The mechanical retainers would have a width that is greater than the groove retaining portion 49. The plurality of mechanical attachment portions 47 on cover tile $45_f$ are preferably aligned so as to be substantially parallel to a centerline of the respective groove 46 that the flow path cover tile $45_f$ interlocks with. A groove retaining portion 49 forms a pair of lips 52 that mate with the dovetail 51 to restrain the flow path cover files $45_f$ from movement away from the spar surface 200. More specifically, when the dovetails 51 of the mechanical attachment portions 47 are disposed within the groove restraining portion 49 the flow path cover tile $45_f$ motion is substantially is limited to a sliding motion within the channel 53. Channel 53 passes along the length of groove 46 through the groove retaining portion 49 and the groove entry portion 48.

A portion of the spar 44 forms a restraint for limiting the movement of the flow path cover tiles 45 in the direction of arrow B. A lip structure 201 extends outwardly from spar 44 to retrain the movement of the plurality of flow path cover tiles 45. During rotation of the airfoil 30 the plurality of flow path cover tiles 45 are biased by centrifugal forces towards the lip structure 201. The biasing of the plurality of flow path cover tiles 45 against the lip structure 201 also forms a substantially fluid tight seal. More particularly, the rotation of airfoil 30 creates a centrifugal force that loads the plurality of airfoils 45 against the lip structure 201 of spar 44. In an alternate embodiment, a portion of the groove 46 includes an upstanding boss member that comes into abutting contact with at least one of the plurality of mechanical attachment portions 47. Upon rotation of the airfoil the centrifugal force loads the flow path cover tile against the upstanding boss member.

Figure 4:
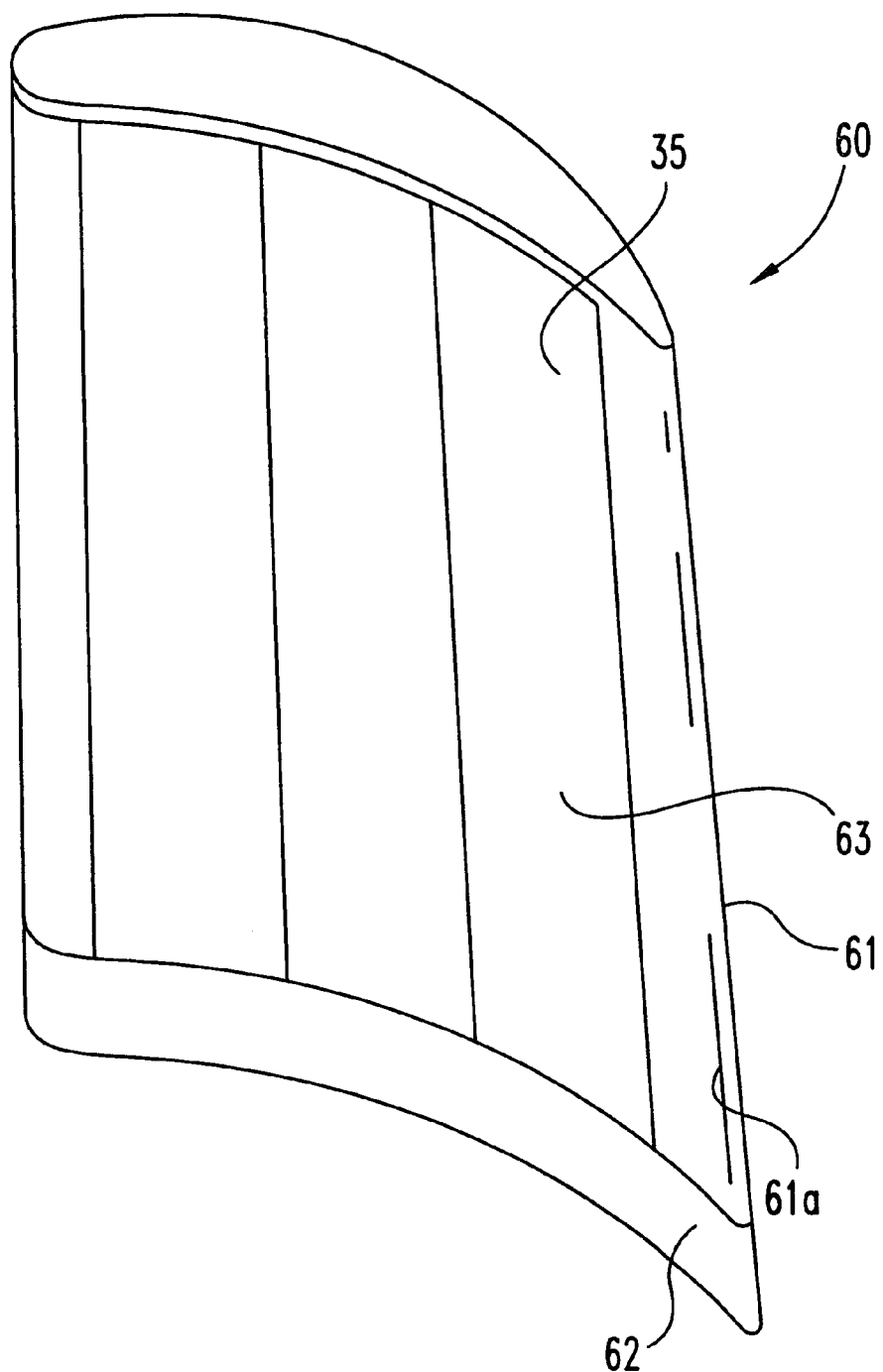
FIG. 4 is an illustrative view of an alternative embodiment of an airfoil of the present invention.

With reference to FIG. 4, there is illustrated an alternative embodiment of an airfoil 60 of the present invention. Airfoil 60 is substantially similar to the prior embodiment of airfoil 30. A major distinction between airfoil 30 and airfoil 60 is that a portion 61 of the outer surface 63 does not include a removable flow path cover tile. More specifically, the trailing edge portion 61 does not include a removable flow path cover tile. Rather the trailing edge portion 61 is integrally formed with the spar 62. More preferably, trailing edge portion 61 defines a cast metallic surface $61_a$ which is coated with a thermal barrier coating. However, in an alternate embodiment the surface 61a is uncoated. The spar 62 is substantially similar to spar 44 with the exception being that the trailing edge portion 61 defines part of the outer surface 63 of the airfoil portion 35. The remainder of the outer surface 63 of the airfoil 60 is covered by a plurality of flow path cover tiles as previously disclosed.

Figure 5:
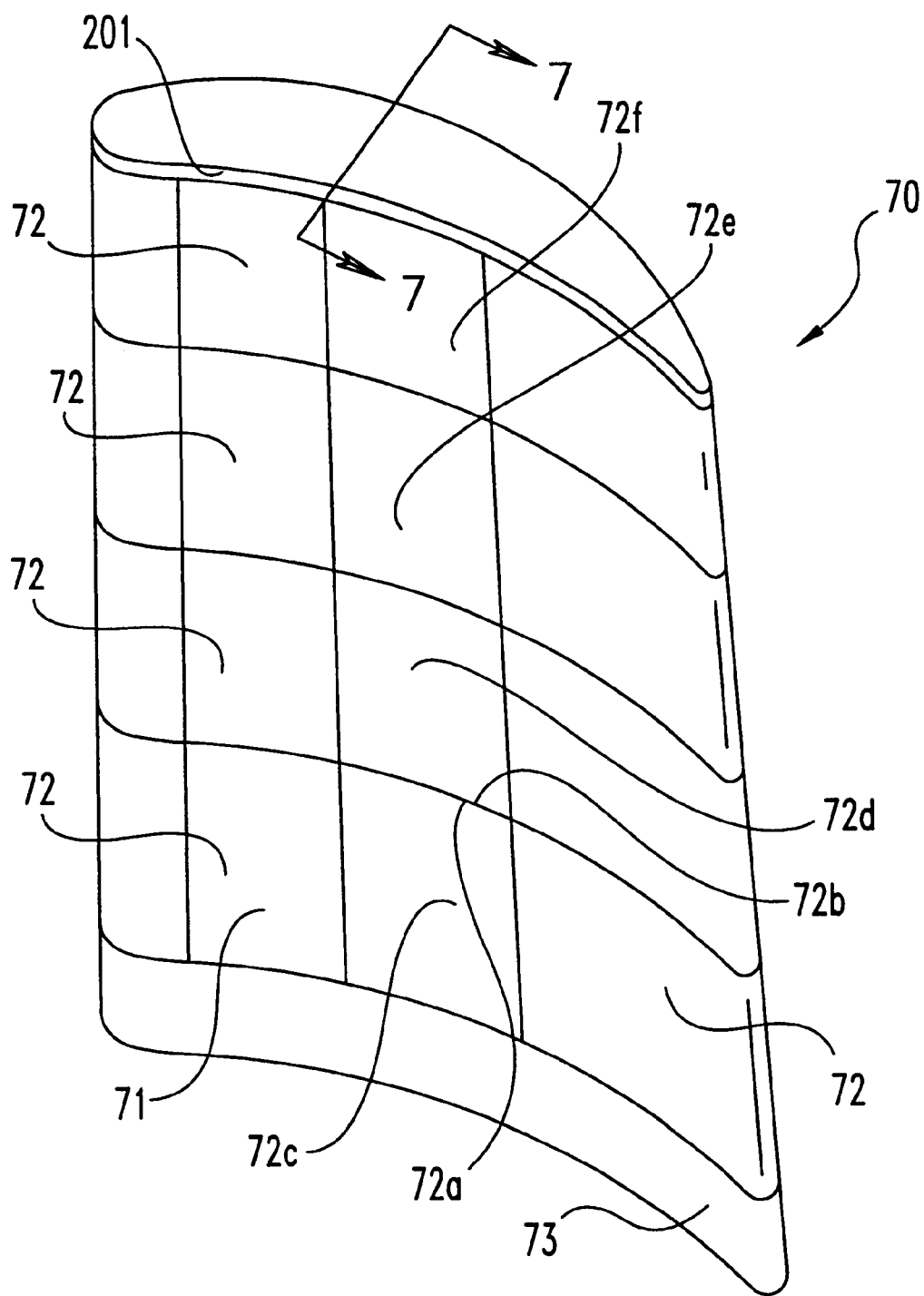
FIG. 5 is an illustrative view of another embodiment of an airfoil of the present invention.

With reference to FIG. 5, there is illustrated another embodiment of an airfoil 70 which is substantially similar to airfoils 30 and 60. The major distinction is that the outer surface 71 is covered by a plurality of flow path cover tiles 72 that are discrete in the spanwise direction. In contrast, the flow path cover tiles set forth in airfoils 30 and 60 extend continuously in the spanwise direction. The plurality of flow path cover tiles 72 are removably attached to spar 73 by the "plug and slide" technique set forth above. In the preferred embodiment, the grooves that the plurality of flow path cover tiles 72 interlock with are discontinuous. Further, the adjacent edges $72_a$ and $72_b$ of adjoining flow path cover tiles abut and are centrifugally loaded during rotation of the airfoil 70. More specifically, in a preferred embodiment the series of flow path cover tiles $72_{c-f}$ abut one another and are centrifugally loaded with the lip structure 201 of spar 73.

Figure 6:
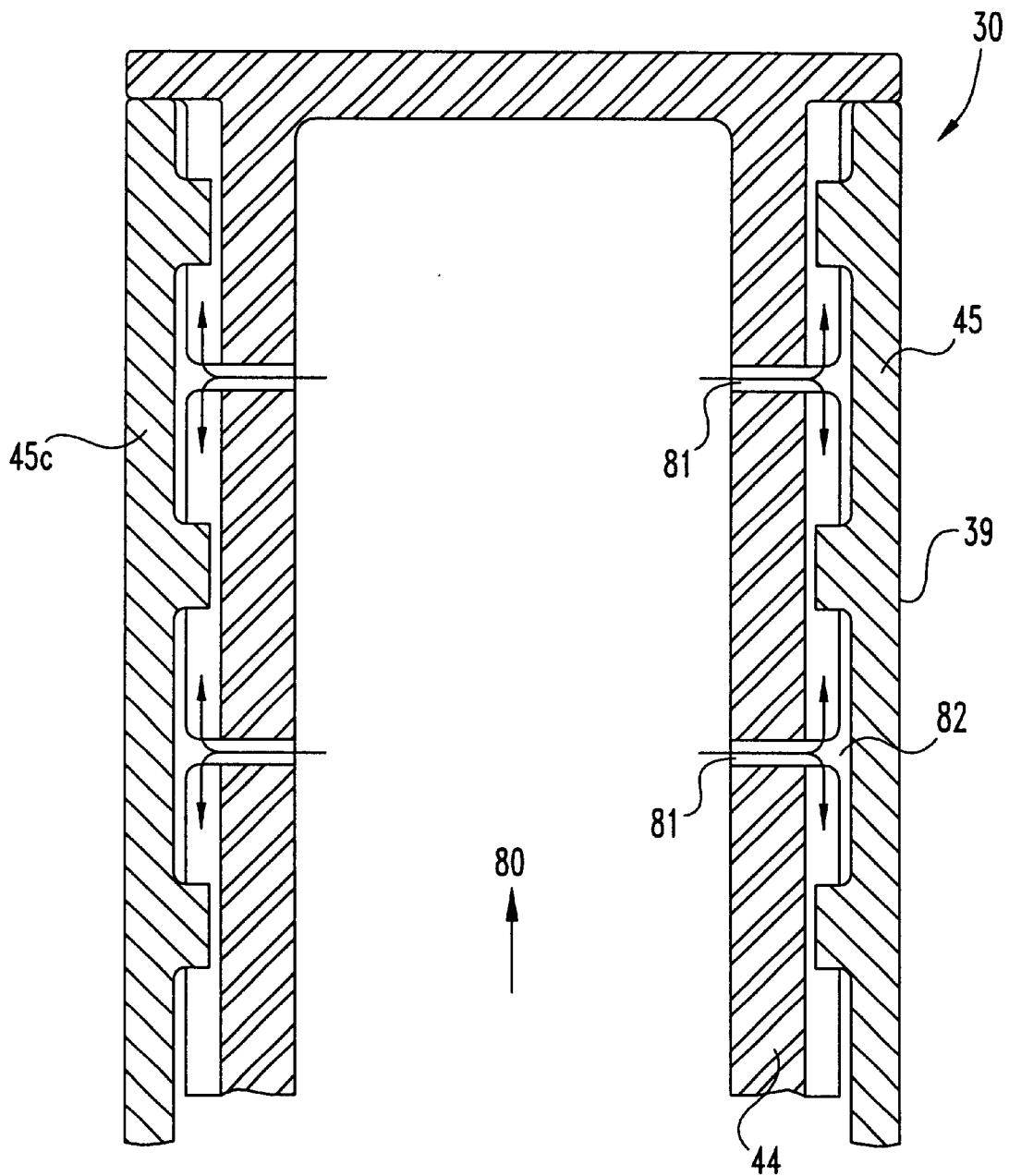

With reference to FIG. 6, there is illustrated an illustrative sectional view taken along lines 2—2 of FIG. 2a. The spar 44 includes a hollow cavity 80 that functions as an internal passageway for receiving the cooling media from the compressor 23 and distributing within the airfoil 30. The cooling media passes through a plurality of metering apertures 81 that discharge cooling media onto the flow path cover tile inner surface 82. The metering apertures 81 are shown passing into the grooves 46. However, in another embodiment the metering apertures 81 are formed through the spar 44 at locations such that they do not intersect the grooves 46, thereby allowing cooling media discharge onto the cover tile inner surface 82 away from the groove. The cooling media impinges on the inner surface 82 of the flow path cover tiles and is discharged through cooling media exit slots 43 (FIG. 2a) to provide film cooling on the outer surface 39 of the airfoil.

The term linear groove will be used herein to denote a groove that does not have to be broken up into discrete portions in order to meet the geometric profile of the outer surface 39 of the airfoil 30. The embodiment of airfoil set forth in FIG. 6 has linear grooves with a plurality of flow path cover tiles 45 that each extend the entire span of the outer surface 39.

Figure 7:
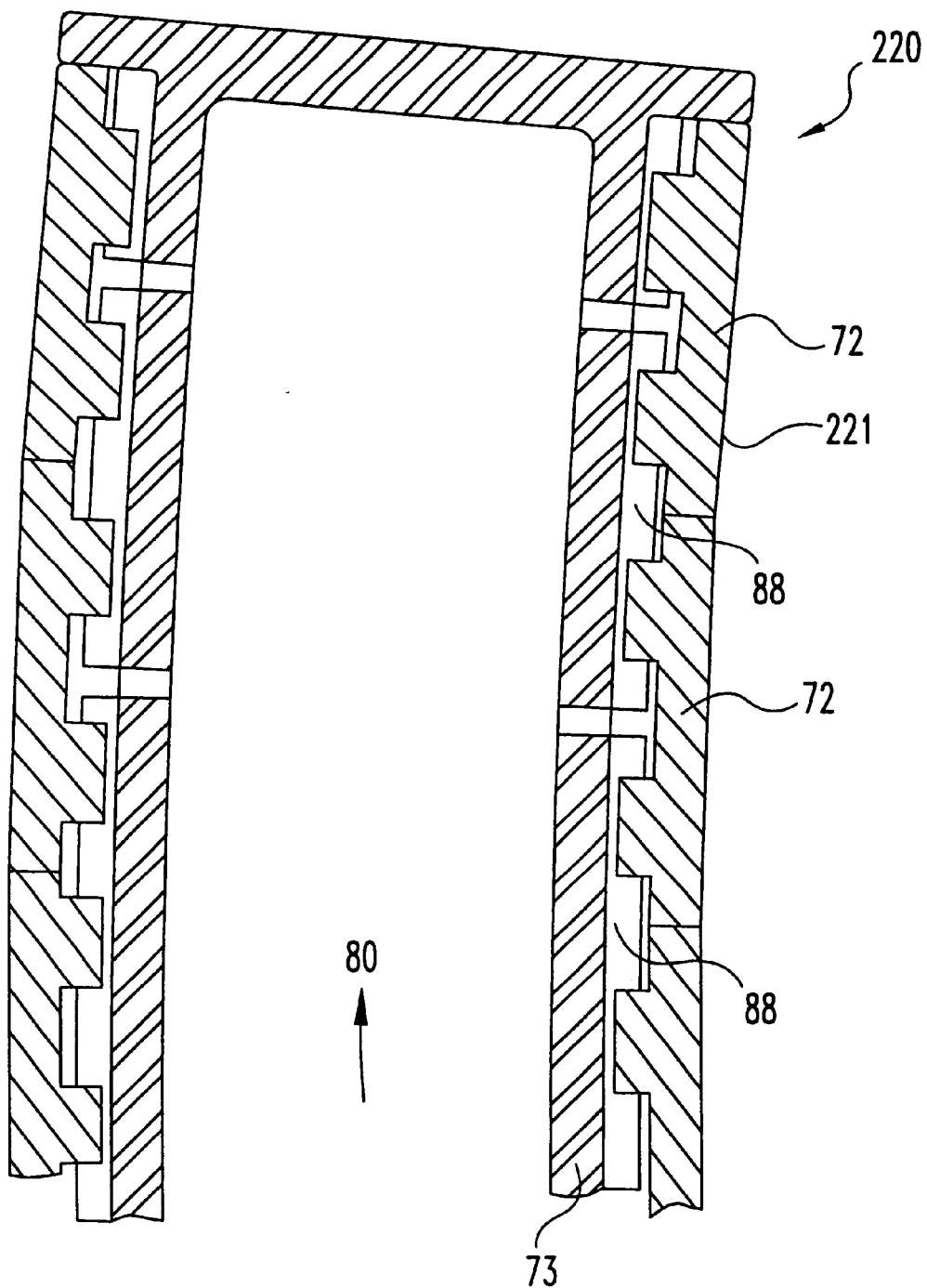

With reference to FIG. 7, there is illustrated an illustrative cross-sectional view taken along line 7—7 of FIG. 5. For the purpose of explanation, the embodiment of the airfoil 220 set forth in FIG. 7 has a substantially non-linear form grooves as used herein. In the preferred embodiment, the term non-linear grooves describes a series of linear but discontinuous grooves. More specifically, the outer surface 221 has a geometry that requires the utilization of a plurality of flow path cover tiles 72 to extend in the spanwise orientation. The spar 73 has a plurality of groves 88 formed therein that are not co-linear. More specifically, the grooves 88 are discrete and do not extend the entire spanwise direction. Rather, the centerlines of each discrete groove 88 intersect. The plurality of flow path cover tiles 72 abut one another at the edges and are centrifugally loaded against the spar 73 when the airfoil 220 is rotated.

Referring to FIGS. 8–11, there is illustrated a series of schematics of groove patterns within the spar. Referring specifically to FIG. 8, there is illustrated a plurality of substantially identical grooves 90 formed in the spar for receiving the mechanical attachment portion of the flow path cover tiles therein. The series of grooves 90 are arranged in spanwise oriented rows that are aligned in the direction of arrow Z. In one embodiment the series of grooves 90 in a spanwise row are not co-linear, however in another embodiment the series of grooves in the spanwise direction are co-linear.

Referring to FIG. 9, there is illustrated an alternative arrangement of groove patterns within the spar. The plurality of grooves 91, 92, and 93 are of different spanwise length and have a different number of retaining portions. Each of the grooves 91, 92, and 93 are formed in the spar for receiving the mechanical attachment portion of a flow path cover tile therein. The series of grooves 91, 92, and 93 are arranged in a spanwise orientation that is aligned in the direction of arrow Z. In one embodiment, the series of grooves 91, 92, and 93 are not co-linear, however in another embodiment the series of grooves in the spanwise direction are co-linear.

With reference to FIG. 10, there is illustrated a series of grooves 94, 95, and 96 formed within the spar. The plurality of grooves 94, 95, and 96 are of different length and have a different number of retaining portions. A second series of grooves 97, 98, and 99 are also of different length and number of retaining portion. The two series of grooves 94, 95, 96 and 97, 98, 99 are not aligned in the streamwise orientation. In one embodiment, each of the series of grooves are not co-linear, however in another embodiment at least one of the series of grooves in the spanwise direction are co-linear.

With reference to FIG. 11, there is illustrated an alternate embodiment of a groove pattern within the spar. The grooves formed within the spar are not aligned co-linear from the first end 225 to the opposite end 226. Rather, the grooves are oriented relative to each other such that they are staggered in a streamwise direction.

Figure 12:
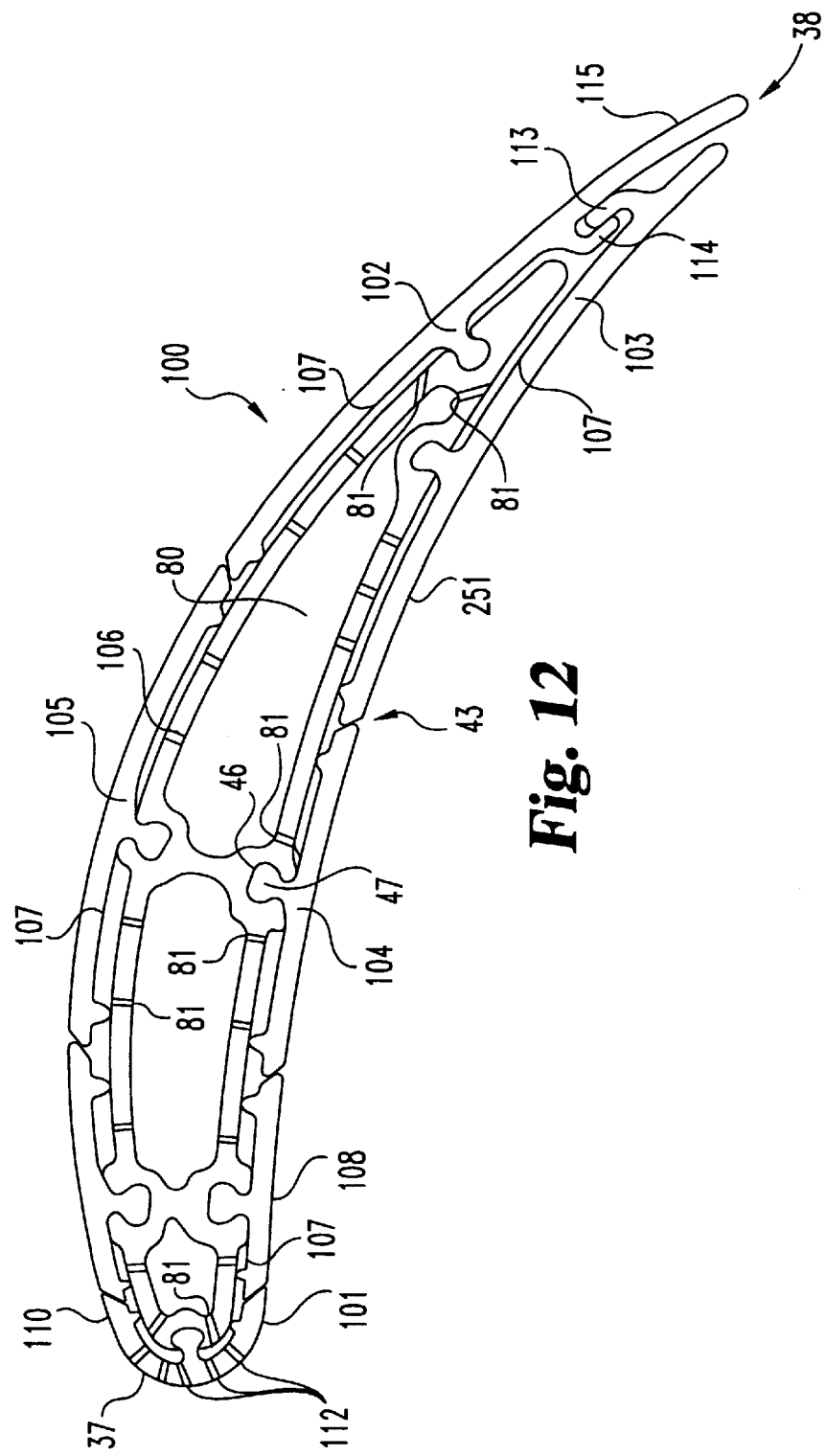
FIG. 12 is an illustrative sectional view of an airfoil having a plurality of flow path cover tiles coupled thereto.

With reference to FIG. 12, there is illustrated an airfoil 100 that is substantially similar to the airfoils described previously herein. The airfoil 100 is illustrated in section to more particularly point out features of the leading edge cover tile 101 and the trailing edge cover tiles 102 and 103. Each of the plurality of cover tiles 101, 102, 103, 104 and 105 are coupled to the spar 106 by the "plug and slide" technique, which includes a mechanical attachment portion 47 disposed within a groove 46 of the respective cover tile. Further, cooling media from the compressor 22 is directed through the internal cavity 80 within the spar 106 and out through a plurality of metering apertures 81 that control the passage of the cooling media along the inner surface 107 of the plurality of flow path cover tiles. The cooling media flows along the inner surface of the cover tiles and out through the cooling media exit slots 43 that are defined where two cover tiles terminate. There is a gap between the respective two adjacent cover tiles that allows for the angled discharge of cooling media onto the outer surface 251 of the airfoil 100.

The leading edge cover tile 101 is designed to wrap around from the pressure surface 108 through the stagnation region to the suction surface 110. Formed at the leading edge 37 are a plurality of cooling fluid discharge apertures 112. The cooling fluid apertures 112 receive cooling media from internal cooling conduit 80, which has been metered through metering apertures 81.

One embodiment of the trailing edge 38 of the airfoil 100 is defined by two trailing edge cover tiles 102 and 103 that mechanically interlock. The interlocking of the two trailing edge cover tiles 102 and 103 is accomplished by a pair of intermittent spanwise extending members 113 and 114 that sliding engage relative to each other to maintain the trailing edge outer surface on the pressure side 108 and suction side 110 in a fixed relationship. Preferably, the spanwise extending members 113 and 114 are defined by a plurality of discontinuous members that are spaced along the spanwise direction. The coupling of the first interlocking member 113 with the second inner locking member 114 is accomplished by sliding them relative to each other as the cover tiles 102 and 103 are being mounted with the "plug and slide" technique.

Figure 13:
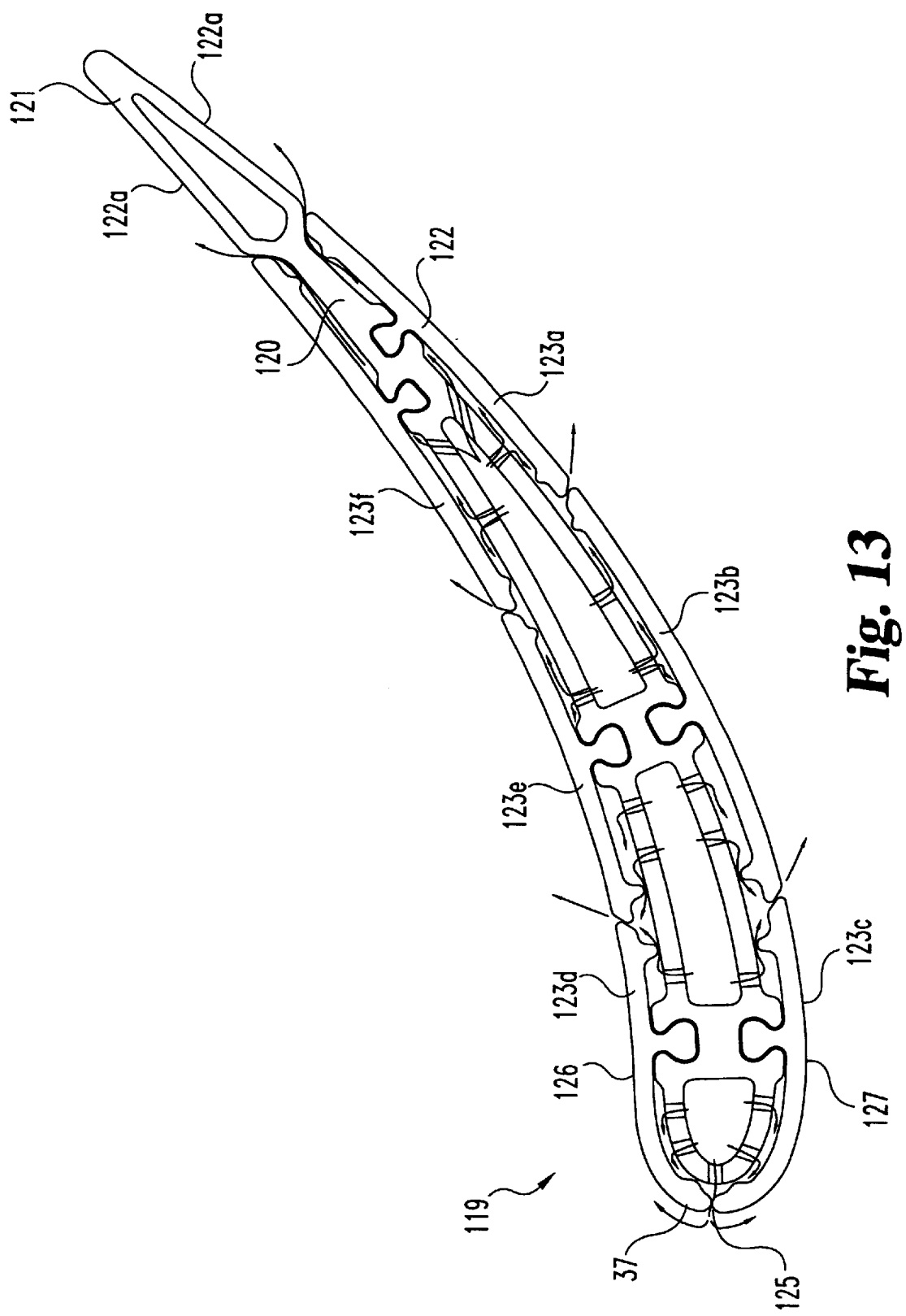
FIG. 13 is an illustrative sectional view of another embodiment of an airfoil having a plurality of flow path cover tiles coupled thereto.

With reference to FIG. 13, there is illustrated a sectional view of an airfoil 119 having a plurality of flow path cover tiles $123_{a-f}$ coupled to a spar 120. The trailing edge portion 121 of spar 120 defines a portion 122$_a$ of the outer surface 122 of airfoil 119. The plurality of flow path cover tiles 123$_{a-f}$ are substantially similar to the flow path cover tiles previously disclosed. More specifically, the flow path cover tiles are removably coupled to the spar 120 with the "plug and slide" technique. In the preferred embodiment, the leading edge 37 has a cooling media exit slot 125 formed by the space between the two adjacent flow path cover tiles 123$_c$ and 123$_d$. Cover tile 123$_d$ wraps around from the pressure surface 126 to the leading edge 37, and cover tile 123$_c$ wraps around from the suction surface 127 to the leading edge 37. Thus the leading edge portion of the airfoil has a cooling media exit slot 125. The configuration set forth for airfoil 119 is applicable with a plurality of flow path cover tiles that each extend the entire spar length of the airfoil, or in contrast where the entire spar length requires a series of flow path cover tiles to cover.

Figure 14:
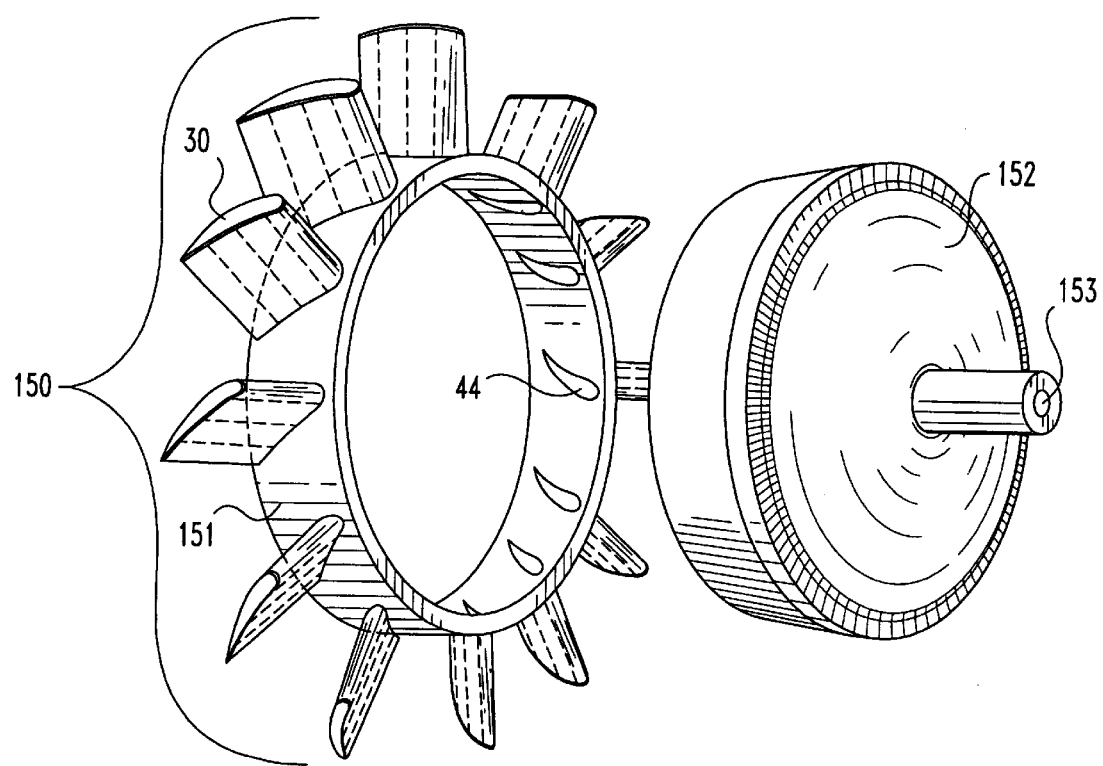
FIG. 14 is a perspective view of a blisk configuration comprising a plurality of airfoils of one embodiment of the present invention.

With reference to FIG. 14, there is illustrated a partially exploded view of a blisk 150. Blisks are generally well known to people of ordinary skill in the art and include a ring 151 bonded to a disk 152. A shaft 153 is fixedly mounted to the disk 152 and allows the rotation of the blisk as an assembly. A plurality of airfoils 30 are bonded to the ring 151. More particularly, in the preferred embodiment of blisk 150, the spar 44 is bonded to the ring 151.

Figure 16:
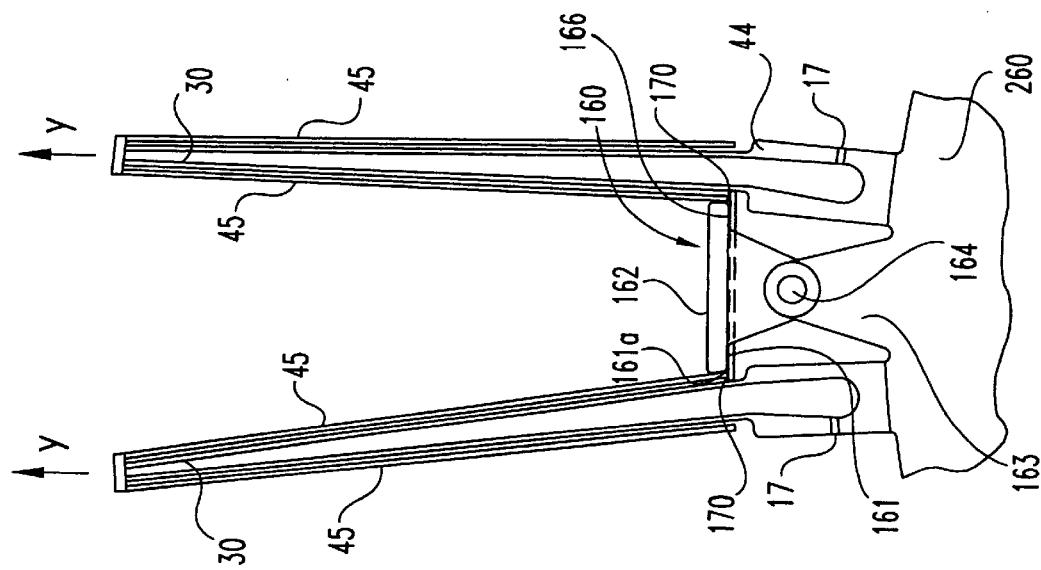
FIG. 16 is an illustrative view of the static structure of FIG. 15 positioned in its supporting mode.
Figure 15:
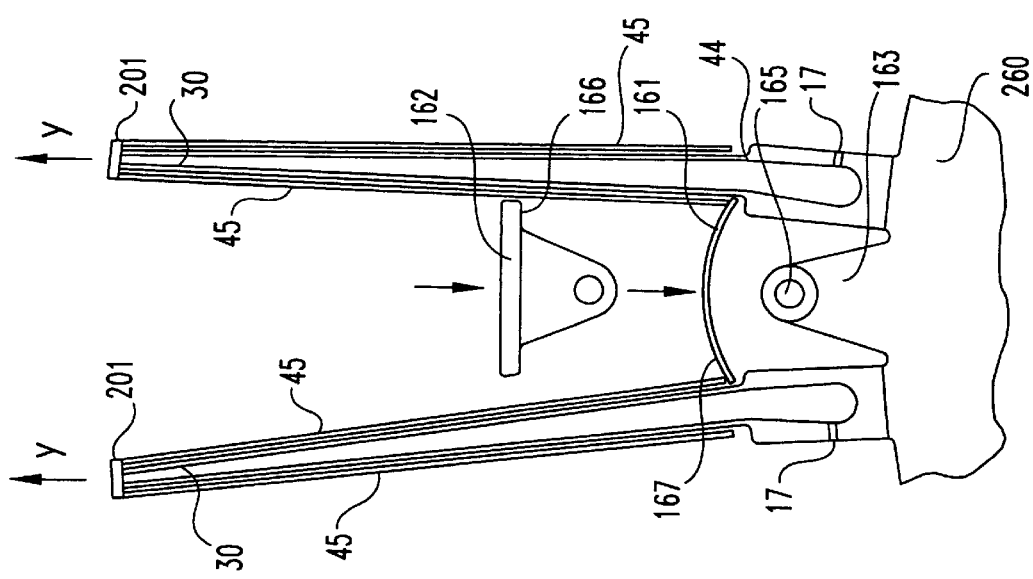
FIG. 15 is an illustrative view of one embodiment of the structure for holding the plurality of flow path cover tiles in place during a static state.
Figure 17:
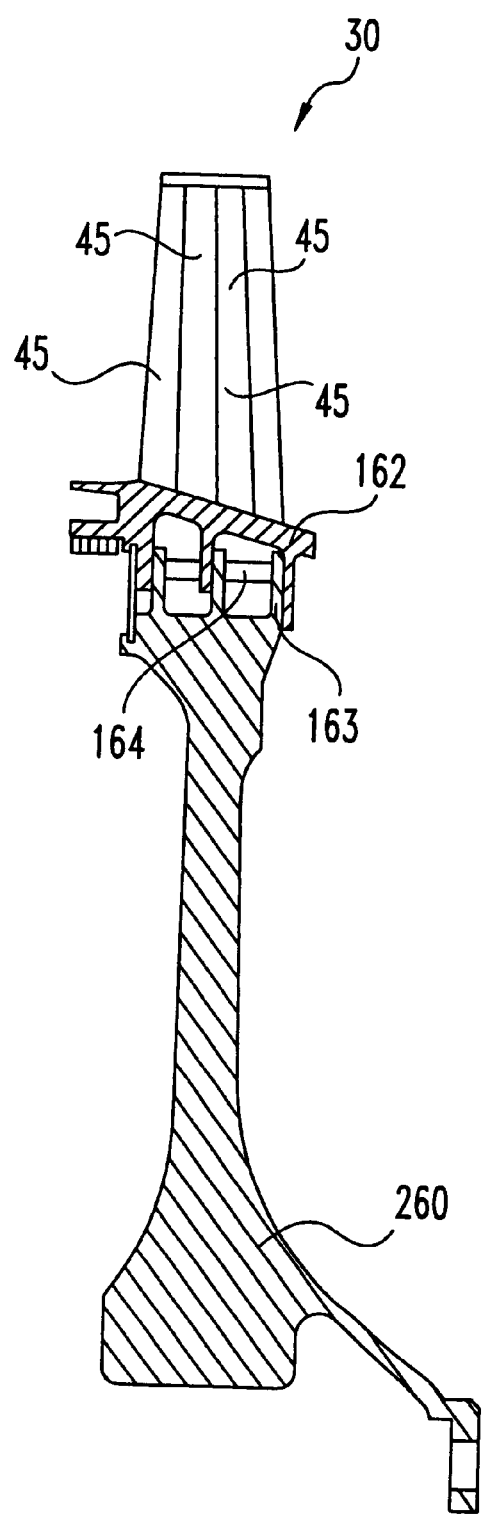
FIG. 17 is an illustrative sectional view of a rotor disk with an airfoil of the present invention coupled thereto.

Referring to FIGS. 15–17, there is illustrated one embodiment of a means for holding 160 the plurality of flow path cover tiles 45 in an initial radial position relative to spar 44 when the disk 260 is not rotating. The means for holding 160 the plurality of flow path cover tiles in place is utilized when the components are not rotating or when there is not significant centrifugal loading so as to bias the plurality of flow path cover tiles 45 radially outward toward surface 201 of the spar 44. The rotation of disk 260 causes the plurality of flow path cover tiles to be biased outwardly in the direction of arrow Y and centrifugally loaded against lip surface 201. A leaf seal 161, a hub flow path segment 162, a mounting structure 163, and a clevis pin 164 comprise the components of one embodiment of the means for holding the plurality of flow path cover tiles 45 in place during a non-rotating mode. The hub flow path segment 162 extends the axial distance of the disk and has an outer surface that defines a flow path surface.

The leaf seal 161 is positioned beneath the respective plurality of cover tiles on two adjacent airfoils 30 and extends therebetween. An upper surface 161$_a$ engages the ends 170 of the plurality of flow path cover tiles 45. Hub flow path segment 162 is positioned such that a portion 166 engages the upper surface 161$_a$ of the leafseal 161 and flattens the leafseal 161 out to bias the plurality of flow path cover tiles away from the disk 260. Clevis pin 164 passes through the hub flow path segment 162 and mounting structure 163 to lock the means for holding 160 in place.

Figure 18:
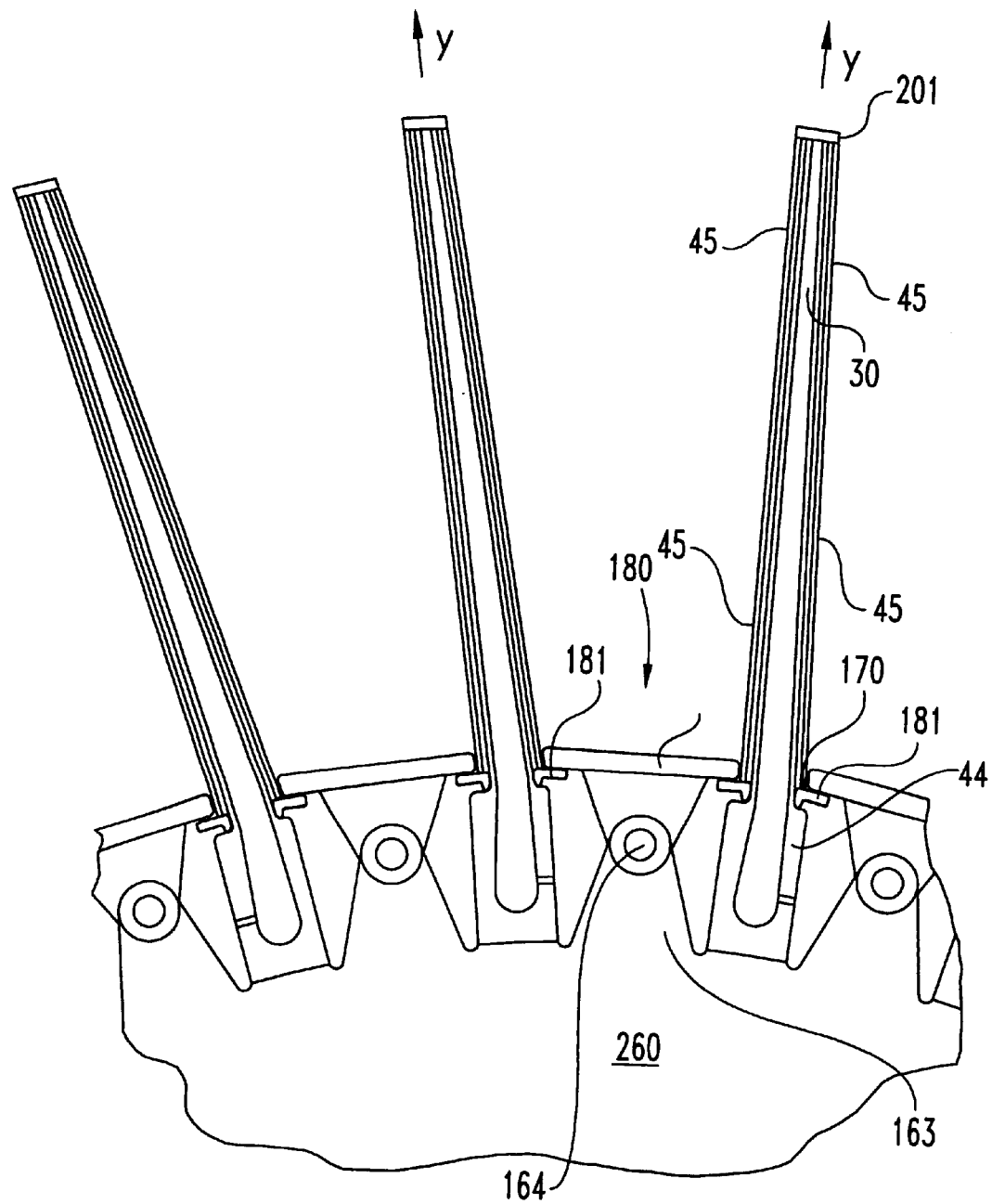
FIG. 18 is an illustrative view of an alternative embodiment of the structure for holding the plurality of flow path tiles in place during a static state.

With reference to FIG. 18, there is illustrated an alternative embodiment 180 of the means for holding the plurality of flow path cover tiles 45 in their initial radial position relative to spar 44 when the disk 260 is not rotating. The means for holding the plurality of flow path cover tiles in place during the initial static condition is substantially similar to the means for holding 160. However, the means for holding 180 structure includes a seal 181 that wraps around the perimeter of the shank of the airfoil and contracts the ends 170 of each of the plurality of flow path cover tiles 45. The seal 181 functions to hold the plurality of flow path cover tiles 45 in their radial position while providing a substantially fluid tight seal.

Figure 19:
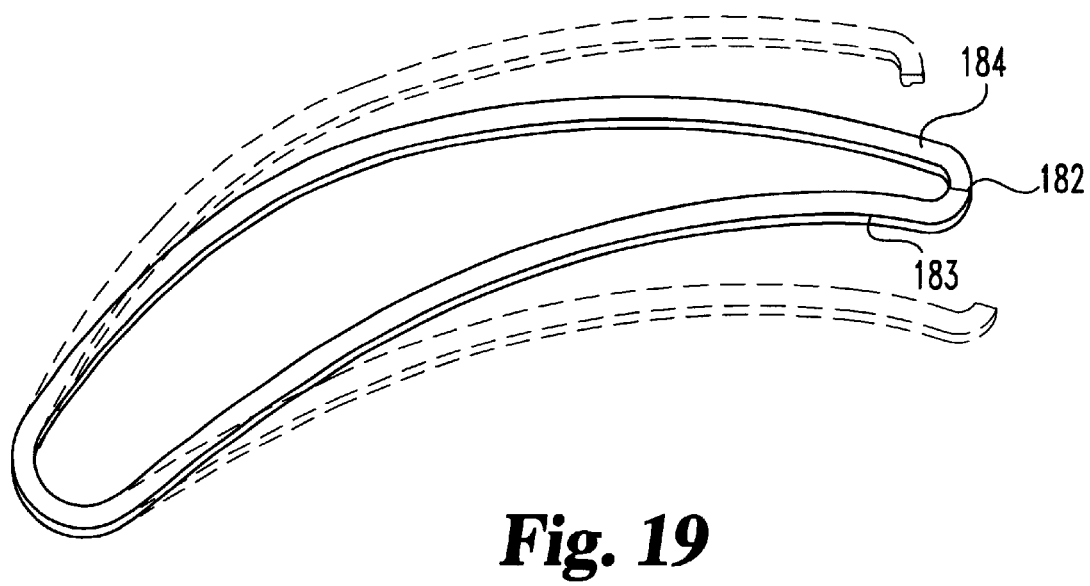
FIG. 19 is an illustrative plan view of the seal comprising a portion of the FIG. 18. structure for holding the plurality of flow path cover tiles in place.

Referring to FIG. 19, there is illustrated one embodiment of the seal 181 removed from the assembly 180. In the preferred embodiment the seal 181 is split at a location 182 and includes two arms 183 and 184 that are deflectable so as to allow the seal 181 to be placed around the perimeter of the airfoil. Thereafter the split seal 181 is released and the arms 183 and 184 are returned a closed position thereby providing initial static support for the plurality of flow path cover tiles 45 and a substantially fluid tight seal.

Figure 20:
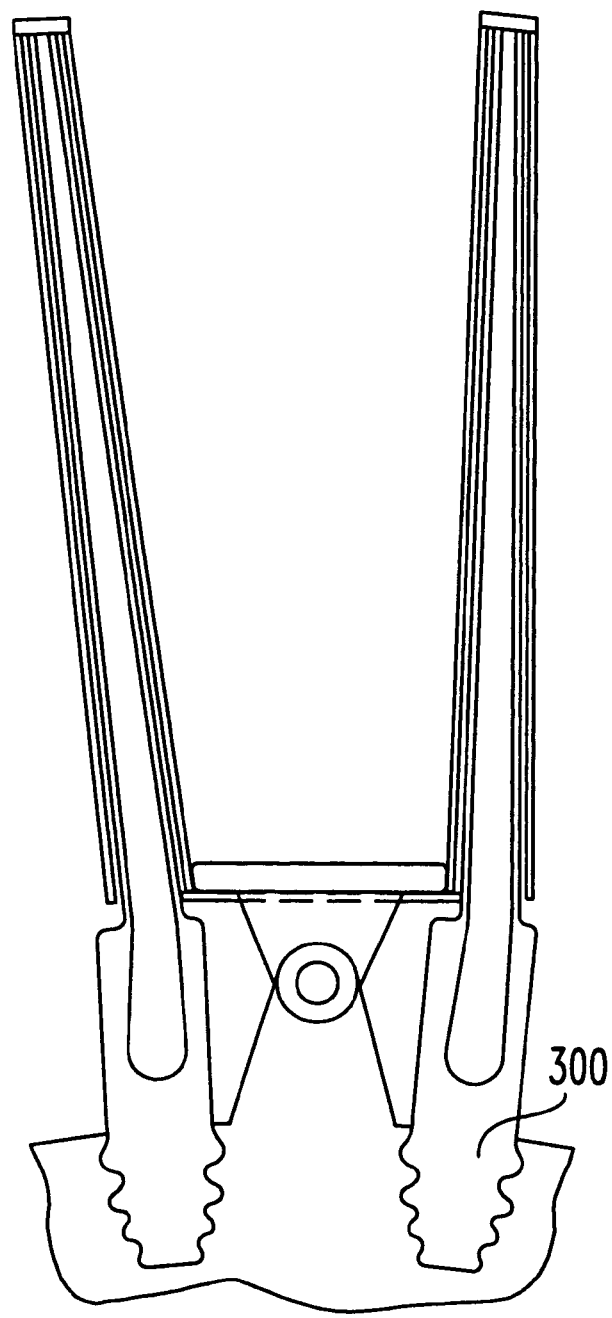
FIG. 20 is an illustrative view of an alternative embodiment of a rotor disk with airfoils of the present invention coupled thereto.

With reference to FIG. 20, there is illustrated an alternative embodiment of the present invention. The plurality of airfoils are substantially similar to the airfoils disclosed previously herein. FIG. 20 more particularly points out that the airfoils may be coupled to the disk by a dovetail attachment portion 300. The term dove tail attachment portion 300 is intended to include mechanical attachments such as firtree and dovetail. A dovetail is a common term for a single lobed attachment, and a firtree is a common term for a multi lobed attachment. The remaining features are substantially similar to other disclosed herein.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A combination, comprising:
    an airfoil shaped device having an outer surface;
    a structural member disposed within said device, said structural member has one of a groove formed therein and an attachment member extending therefrom; and
    a cover member defining at least a portion of said outer surface, said cover member has the other of said groove formed therein and said attachment member extending therefrom, said attachment member extends into said groove to couple said structural member and said cover member and allows relative sliding motion therebetween so as to bias said cover member against said structural member during rotation.

2. The combination of claim 1, wherein said structural member defines a spar, and wherein said structural member has said groove formed therein and said cover member has said attachment member extending therefrom.

3. The combination of claim 2, wherein said attachment member includes a dovetail portion, and wherein said attachment member when positioned within said groove is restrained by a pair of lip members that mate with said dovetail portion to restrain movement of said cover member away from said structural member.

4. The combination of claim 3, wherein said groove includes a first portion having a width at least as wide as said attachment member and a second portion having a width less than the width of said attachment member.

5. The combination of claim 4, wherein said structural member has an outwardly extending lip to restrain movement of said cover member during rotation of said device.

6. The combination of claim 1, wherein said cover member is biased against said outwardly extending lip during rotation, and wherein a substantially fluid tight seal is formed between said lip and said cover member.

7. The combination of claim 6, wherein said cover member is formed of a material selected from the group consisting of ceramic, intermetallic or a thermal barrier coated alloy material.

8. The combination of claim 1, wherein said at least a portion of said outer surface is defined by a plurality of said cover members.

9. The combination of claim 8, wherein said outer surface is defined by said plurality of cover members.

10. The combination of claim 9, wherein said structural member is formed of a super-alloy material.

11. The combination of claim 1, wherein said structural member is a unitary cast single crystal alloy structure.

12. The combination of claim 11, wherein said cover member includes an inner surface, and wherein said structural member includes an internal passageway adapted for distributing a cooling media, and wherein said structural member includes at least one aperture therein and in fluid communication with said internal passageway for discharging the cooling media against said inner surface of said cover member.

13. The combination of claim 12, wherein said at least one aperture is a metering aperture adapted to control the amount of cooling media passing therethrough.

14. The combination of claim 13, wherein said at least a portion of said outer surface is defined by at least two of said cover members, each of said cover members having a spanwise extending edge, and wherein said spanwise extending edges are spaced to define a slot therebetween adapted for passage of a cooling media.

15. The combination of claim 14, wherein said slot is formed at an acute angle to said outer surface.

16. The combination of claim 15, wherein said outer surface has a streamwise orientation and a spanwise orientation, and wherein said outer surface is defined by at least two of said cover members spaced streamwise from each other and extending the entire span of said outer surface.

17. The combination of claim 16, wherein said outer surface is defined by at least two of said cover members, and wherein said at least two of said cover members abut one another and extend spanwise a distance greater than a length of any of said individual cover members.

18. The combination of claim 17, wherein said cover members have different spanwise lengths.

19. The combination of claim 1, which further includes means for retaining said cover member in an initial position during non-rotation.

20. The combination of claim 19, wherein said outer surface includes a pressure side portion, a suction side portion, and a leading edge portion, and which further includes a leading edge cover member extending between said pressure side portion and said suction side portion, and wherein said leading edge cover member is coupled to said structural member substantially similar to the coupling of said cover member to said structural member.

21. The combination of claim 20, wherein said outer surface includes a pressure side portion, a suction side portion and a leading edge portion, said leading edge portion defined by a pair of leading edge cover members extending between said pressure side portion and said suction side portion, and wherein said pair of leading edge cover members are coupled to said structural member substantially similar to the coupling of said cover members to said structural member.

22. The combination of claim 1, wherein said pair of leading edge cover members define a slot therebetween for passage of a cooling media therethrough.

23. The combination of claim 1, wherein said outer surface includes a trailing edge portion defined by a first trailing edge cover member and a second trailing edge cover member, and wherein said trailing edge cover members mechanically interlock to maintain a fixed spatial relationship.

24. The combination of claim 1, wherein said first trailing edge cover member has at least one first interlocking member and said second trailing edge cover member has at least one second interlocking member, and wherein said mechanical interlocking is accomplished by sliding said first and second interlocking members relative to one another as said first and second trailing edge cover members are coupled to said structural member.

25. The combination of claim 24, wherein said outer surface has a trailing edge portion integrally formed with said structural member.

26. A method for coupling a flow path cover tile with a spar, comprising;
providing a first member having a plurality of spaced mechanical attachment members extending therefrom and a second member having a groove with a plurality of receiving portions and a plurality of restraining portions, wherein the first member is one of the flow path cover tile and the spar and the second member is the other of the flow path cover tile and the spar;
positioning the plurality of mechanical attachment members within the plurality of receiving portions;
moving the first member and second member relative to one another so that the plurality of spaced mechanical attachment members are positioned within the plurality of restraining portions; and
supporting one of the first member and the second member in a first location during a static state.

27. The method of claim 26, which further includes centrifugally biasing the one of the first member and the second member during a rotating state.

28. The method of claim 1, which further includes retaining the one of the first member and the second member in a second location during the rotating state.

29. The method of claim 2, which further includes discharging a cooling media onto at least one of the first member and the second member.

30. The method of claim 29, wherein the first member is the flow path cover tile and the second member is the spar.

31. The method of claim 30, wherein the first member is the spar and the second member is the flow path cover title.

32. A gas turbine engine blade, comprising:
an airfoil shaped device having an outer surface;
a structural member disposed within said device;
a cover member defining a portion of said outer surface, one of said cover member and said structural member has a mechanical attachment portion and the other of said cover member and said structural member has a receiving portion, said mechanical attachment portion has a plurality of spaced upstanding mechanical retainers extending therefrom; and
said receiving portion defines a groove with a first portion having a width at least as wide as said mechanical retainers and a second portion with a width less than the width of said mechanical retainers, wherein said plurality of spaced mechanical retainers are positionable within said second portion to couple said cover member to said structural member.

33. The gas turbine engine blade of claim 3, wherein said structural member has said receiving portion formed therein and said cover member includes said mechanical attachment portion, and wherein said structural member defines a spar.

34. The gas turbine engine blade of claim 33, wherein said structural member is formed of a super-alloy material.

35. The gas turbine engine blade of claim 34, wherein said structural member is a single crystal.

36. The gas turbine engine blade of claim 3, wherein said groove includes a centerline, and wherein said plurality of spaced mechanical retainers are aligned substantially parallel to said centerline.

37. The gas turbine engine blade of claim 3, wherein said groove is linear.

38. The gas turbine engine blade of claim 3, wherein said groove is non-linear.

39. The gas turbine engine blade of claim 38, wherein said non-linear groove includes a plurality of discrete groove portions, and wherein each of said plurality of groove portions has a centerline.

40. The gas turbine engine blade of claim 39, wherein said outer surface is defined by a plurality of said cover members, and wherein at least one of said plurality of cover members has a spanwise length different than the spanwise length of the other of said plurality of cover members.

41. The gas turbine engine blade of claim 40, wherein said groove portions have different spanwise lengths.

42. A gas turbine engine blade, comprising:

an airfoil shaped device having an outer surface;

a structural member disposed within said device;

a plurality of flow path cover tiles defining a portion of said outer surface; and plug and slide means for coupling each of said plurality of flow path cover tiles with said structural member.

43. The gas turbine engine blade of claim 42, which further includes support means for holding said plurality of flow path cover tiles in a first location during a static state.

44. The gas turbine engine blade of claim 43, wherein said flow path cover tiles are biased in a radial direction during a rotating state.

45. The gas turbine engine blade of claim 44, which further includes retaining means for restraining outward radial movement of said plurality of flow path cover tiles during the rotating state.

46. The gas turbine engine blade of claim 45, which further includes a continuous cooling media discharge between at least two of said plurality of flow path cover tiles.

47. An apparatus, comprising:

a rotatable member;

a plurality of gas turbine engine blades coupled to said rotatable member;

each of said plurality of gas turbine engine blades comprising:

a structural member, said structural member has one of a groove formed therein and an attachment member extending therefrom; and a cover member defining a portion of an outer surface of said gas turbine engine blade, said cover member has the other of said groove formed therein and said attachment member extending therefrom, said attachment member extends into said groove to couple said structure member and said cover member and allow relative sliding motion therebetween in a first state, and said cover member is biased against said structural member in a second state.

48. The apparatus of claim 47, wherein said second state defines rotation.

* * * * *